(12) United States Patent
Lee et al.

(10) Patent No.: US 11,702,028 B2
(45) Date of Patent: Jul. 18, 2023

(54) SEAT AIRBAG FOR VEHICLE

(71) Applicant: HYUNDAI MOBIS CO., LTD., Seoul (KR)

(72) Inventors: Choong Ryung Lee, Yongin-si (KR); Sang Won Hwangbo, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/246,974

(22) Filed: May 3, 2021

(65) Prior Publication Data

US 2021/0354654 A1    Nov. 18, 2021

(30) Foreign Application Priority Data

May 13, 2020 (KR) .................. 10-2020-0057390

(51) Int. Cl.
| | |
|---|---|
| *B60R 21/231* | (2011.01) |
| *B60R 21/207* | (2006.01) |
| *B60R 21/233* | (2006.01) |
| *B60R 21/237* | (2006.01) |
| *B60R 21/261* | (2011.01) |

(52) U.S. Cl.
CPC ...... *B60R 21/23138* (2013.01); *B60R 21/207* (2013.01); *B60R 21/233* (2013.01); *B60R 21/237* (2013.01); *B60R 21/261* (2013.01); *B60R 2021/23146* (2013.01); *B60R 2021/23324* (2013.01)

(58) Field of Classification Search
None
See application file for complete search history.

(56) References Cited

U.S. PATENT DOCUMENTS

| | | | |
|---|---|---|---|
| 5,636,862 A | 6/1997 | Cheung et al. | |
| 5,927,750 A | 7/1999 | Nakamura et al. | |
| 6,065,772 A | 5/2000 | Yamamoto et al. | |
| 9,994,181 B1 * | 6/2018 | Dubaisi | B60R 21/207 |
| 10,336,283 B2 * | 7/2019 | Rickenbach | B60R 21/233 |
| 10,486,638 B2 | 11/2019 | Kwon | |

(Continued)

FOREIGN PATENT DOCUMENTS

| | | |
|---|---|---|
| CN | 104276124 A | 1/2015 |
| CN | 107757543 A | 3/2018 |

(Continued)

OTHER PUBLICATIONS

"Extended Search Report issued in European Patent Application No. 21172038.8" dated Aug. 4, 2021, 7 Pages.

(Continued)

*Primary Examiner* — Faye M Fleming
(74) *Attorney, Agent, or Firm* — NovoTechIP International PLLC

(57) ABSTRACT

The present invention relates to a seat airbag for a vehicle in which a cushion storage space 810 capable of accommodating a front cushion 200 is provided at a front end 720 connected to the front cushion 200 in a side cushion 100, and the front cushion 200 folded in a bellows type is inserted and accommodated into the cushion storage space 810. The side cushion 100 and the front cushion 200 can be deployed sequentially with a time difference, so that the reliability of the cushion deployment can be secured.

11 Claims, 10 Drawing Sheets

(56) References Cited

U.S. PATENT DOCUMENTS

| | | | |
|---|---|---|---|
| 10,543,800 B2 | 1/2020 | Kwon | |
| 10,875,486 B2 * | 12/2020 | Kim | B60R 21/23138 |
| 11,247,633 B1 | 2/2022 | Schneider | |
| 2006/0119082 A1 | 6/2006 | Peng et al. | |
| 2006/0131847 A1 * | 6/2006 | Sato | B60R 21/23138 |
| | | | 280/730.2 |
| 2018/0326938 A1 | 11/2018 | Rickenbach et al. | |
| 2019/0054890 A1 * | 2/2019 | Kwon | B60R 21/233 |
| 2019/0111880 A1 | 4/2019 | Choi | |
| 2020/0189514 A1 * | 6/2020 | Yoo | B60N 2/79 |
| 2020/0324728 A1 | 10/2020 | Deng et al. | |
| 2021/0001799 A1 | 1/2021 | Sandinge et al. | |
| 2021/0179009 A1 * | 6/2021 | Lee | B60R 21/233 |
| 2021/0245699 A1 * | 8/2021 | Adler | B60R 21/213 |
| 2021/0354653 A1 * | 11/2021 | Lee | B60R 21/233 |
| 2021/0402949 A1 * | 12/2021 | Sung | B60R 21/23138 |

FOREIGN PATENT DOCUMENTS

| | | |
|---|---|---|
| CN | 110040098 A | 7/2019 |
| CN | 110979240 A | 4/2020 |
| CN | 112810563 A | 5/2021 |
| DE | 102019103484 A1 | 8/2019 |
| DE | 102018104392 A1 | 9/2019 |
| DE | 102018120159 A1 | 9/2019 |
| DE | 102019124091 A1 | 7/2020 |
| DE | 202020106159 U1 | 11/2020 |
| DE | 102020103916 A1 * | 8/2021 |
| JP | H10-175498 A | 6/1998 |
| JP | 2013154786 A | 8/2013 |
| KR | 20190020254 A | 2/2019 |
| KR | 10-2020-0028334 A | 3/2020 |
| KR | 20200075065 A * | 6/2020 |
| KR | 20200141727 A * | 12/2020 |
| WO | 2020017280 A1 | 1/2020 |
| WO | 2020080747 A1 | 4/2020 |
| WO | WO-2020141737 A1 * | 7/2020 |
| WO | WO-2022008403 A1 * | 1/2022 |
| WO | WO-2022008406 A1 * | 1/2022 |

OTHER PUBLICATIONS

"Extended Search Report issued in European Patent Application No. 21172285.5" dated Aug. 2, 2021, 11 Pages.
Office Action dated Mar. 8, 2022 in related U.S. Appl. No. 17/242,543.
Office Action dated Feb. 13, 2023 in corresponding European patent application No. 21172038.8.
Office Action dated Mar. 28, 2023 in corresponding Chinese patent application No. 202110499721.1.
Office Action dated Mar. 29, 2023 in corresponding Chinese patent application No. 202110518873.1.

* cited by examiner

SEAT AIRBAG FOR VEHICLE

CROSS-REFERENCE TO RELATED APPLICATION

This application claims priority from Korean Patent Application No. 10-2020-0057390, filed on May 13, 2020, in the Korean Intellectual Property Office, the disclosure of which is incorporated herein by reference in its entirety.

TECHNICAL FIELD

The present invention relates to a seat airbag for a vehicle having a side cushion and a front cushion, and more particularly, to a structure in which a front cushion in a folded state is accommodated at the front portion of a side cushion and a technology about the time difference deployment operation of a side cushion and a front cushion.

BACKGROUND

Autonomous vehicles are smart vehicles that incorporate autonomous driving technology that allows drivers to go to their destination by themselves without directly operating a steering wheel, accelerator pedal, brake, etc., and have been rapidly developed in recent years.

If autonomous driving situation is universally realized, a driver can select a relaxation mode in which the driver takes a break without driving himself while driving, and in the relaxation mode situation, the movement, rotation and posture of a seat can be changed in various ways according to the needs of a passenger.

As described above, when the seating conditions of passengers are changed in various ways in the autonomous driving situation, the airbag provided in the existing vehicle cannot effectively restrain the passenger's behavior in the event of an accident. Thus, there is a need for a new concept of airbag suitable for autonomous vehicles.

As an example of an airbag suitable for an autonomous vehicle in which a position, rotation, and seating state are changed in various ways according to a passenger's request, there is a technology of a seat airbag in which an airbag cushion is deployed from a seat.

The seat airbag includes a side cushion that is deployed forward from a seatback and covers the side of a passenger, and a front cushion that is deployed from the side cushion to the front of the passenger, and relates to a technology that can further enhance the protection effect of passengers by effectively restraining all the passengers' omnidirectional behavior, including the lateral behavior, forward behavior, and diagonal behavior using the side cushion and front cushion.

In the case of the seat airbag having the side cushion and the front cushion as described above, the side cushion and the front cushion must be sequentially deployed with a time difference.

If the front cushion is deployed too quickly, the front cushion is caught between the passenger and a vehicle door or between the passenger and a center console, increasing the probability of deployment failure due to interference. To prevent this, it would be desirable to start the deployment of the front cushion after the deployment of the side cushion has progressed to some extent.

The matters described as the background art are only for enhancing an understanding of the background of the present invention, and should not be taken as acknowledging that they correspond to the prior art already known to those of ordinary skill in the art.

SUMMARY

The present invention is a configuration in which a cushion storage space capable of accommodating a front cushion is provided at the front portion connected to the front cushion in a side cushion, and the bellow folded front cushion is inserted and accommodated into the cushion storage space. Through such a storage structure of the front cushion, after a certain portion of the deployment of the side cushion has progressed, and then the front cushion begins to deploy with a time difference. Thus, the purpose is to eliminate the deployment failure of the front cushion and secure the reliability of cushion deployment.

In order to achieve the purpose above, the present invention may provide a seat airbag for a vehicle including a side cushion that is deployed to protrude forward from a seatback and is positioned on a side of a passenger, and a front cushion that is deployed to protrude from the side cushion to a front of the passenger. In the airbag, the front cushion may be connected to a front portion of the side cushion based on a deployed state of the side cushion; at the front portion of the side cushion, a cushion storage space may be provided inside the side cushion; the front cushion may be inserted into the cushion storage space in a folded state, and may protrude out of the cushion storage space by airbag gas and may be deployed in front of the passenger.

The front cushion may be bellow folded for quick deployment and may be accommodated in the cushion storage space.

A first separator that divides an inner space of the side cushion while determining a thickness of a deployed cushion may be installed in combination with the side cushion inside the side cushion; and a plurality of first vent holes for controlling a flow of the airbag gas may be positioned in the first separator.

A connection passage for connection with the front cushion may be positioned at the front portion of the side cushion; a second separator that determines a thickness of a deployed cushion may be installed in combination with the side cushion at a rear of the connection passage; and a second vent hole for controlling a flow of the airbag gas supplied to the front cushion may be positioned in the second separator.

A first separator having a first vent hole and a second separator having a second vent hole may be installed in combination with the side cushion inside the side cushion while the second separator is located in a front position of the first separator based on a state in which the side cushion is deployed; and a total cross-sectional area of the first vent hole may be larger than a total cross-sectional area of the second vent hole.

The side cushion and the front cushion may be sewn and coupled along the circumference of the connection passage; a space up to the connection passage based on the second separator may become the cushion storage space; and the cushion storage space may be connected to the front cushion through the connection passage.

The side cushion, from a top to a bottom based on deployed state, may be vertically divided into a head protection area, a shoulder protection area, a chest protection area, an abdominal protection area, and a pelvic protection area; and when a reference line connecting the head protection area and the pelvic protection area up and down in a front of the side cushion is determined, an area protruding toward a front of the reference line may become the front portion of the side cushion on which the connection passage is formed.

The second separator may be installed to match the reference line or is installed to be positioned in front of the reference line within a range that sufficiently secures the cushion storage space.

The cushion storage space may be formed by the second separator that is installed parallel to a vertical sewing line that combines the side cushion and the front cushion, a plurality of the second separators that is installed in a horizontal direction with respect to the vertical sewing line, a plurality of the second separators that is installed in a diagonal direction with respect to the vertical sewing line, or a plurality of coupling points that is coupled to connect both sides of the side cushion in a rear position of the connection passage.

In addition, the present invention may provide a seat airbag for a vehicle including a side cushion that is deployed to protrude forward from a seatback and is positioned on a side of a passenger, and a front cushion that is deployed to protrude from the side cushion to a front of the passenger. In the airbag, in an event of an accident, the side cushion may be first deployed by a pressure of an airbag gas; and the front cushion starts to be deployed with a time difference after the side cushion has started to be deployed.

When the front portion of the side cushion that has started to be deployed may be located in front of the passenger, the front cushion starts to be deployed by the pressure of the airbag gas.

The seat airbag for a vehicle according to the present invention may be a configuration in which a side cushion is deployed to protrude forward from a seatback to protect the side of a passenger, and a front cushion protrudes from the side cushion in front of the passenger to protect the front of the passenger. Thus, it can be applied to various autonomous vehicles in which the movement and rotation of the seat and the seating condition of the passenger are various. Particularly, there is an advantage of being able to more effectively protect the passengers of the autonomous vehicle.

In addition, the embodiment according to the present invention may be configured with an upper tether and a lower tether that have a predetermined area in order to exert a strong restraint force restraining the deployments of the side cushion and the front cushion. Thus, it is possible to effectively restrain the passenger's lateral behavior, forward behavior, and diagonal behavior, thereby further enhancing the passenger's protective effect, and through this, there is the advantage of maximizing the reduction of the passenger's injuries in case of an accident.

In addition, the embodiment according to the present invention may be a configuration in which both the side cushion and the front cushion can cover and protect the portion of a shoulder having relatively high rigidity among the body parts of the passenger. Thus, there is an advantage that can reduce the injuries to passengers as much as possible.

In addition, the embodiment according to the present invention may be a configuration in which a first separator having a first vent hole is installed inside the side cushion, a second separator having a second vent hole is installed in the connection portion of the side cushion and the front cushion, and the total cross-sectional area of the first vent hole is larger than the total cross-sectional area of the second vent hole. There is an advantage of preventing an airbag deployment failure situation in which the front cushion is first inflated before the side cushion is deployed through tuning of the first vent hole and the second vent hole.

In addition, the embodiment according to the present invention may be a configuration in which a cushion storage space capable of accommodating the front cushion is provided at a front portion connected to the front cushion in the side cushion, and the bellow folded front cushion is inserted and accommodated into the cushion storage space. Through the storage structure of the front cushion, a certain portion of the deployment of the side cushion progresses, and then, the deployment of the front cushion starts at a time difference. Thus, there is an advantage of securing the reliability of the cushion deployment by eliminating the deployment failure of the front cushion.

DETAILED DESCRIPTION OF THE PREFERRED EMBODIMENTS

Figure 1:
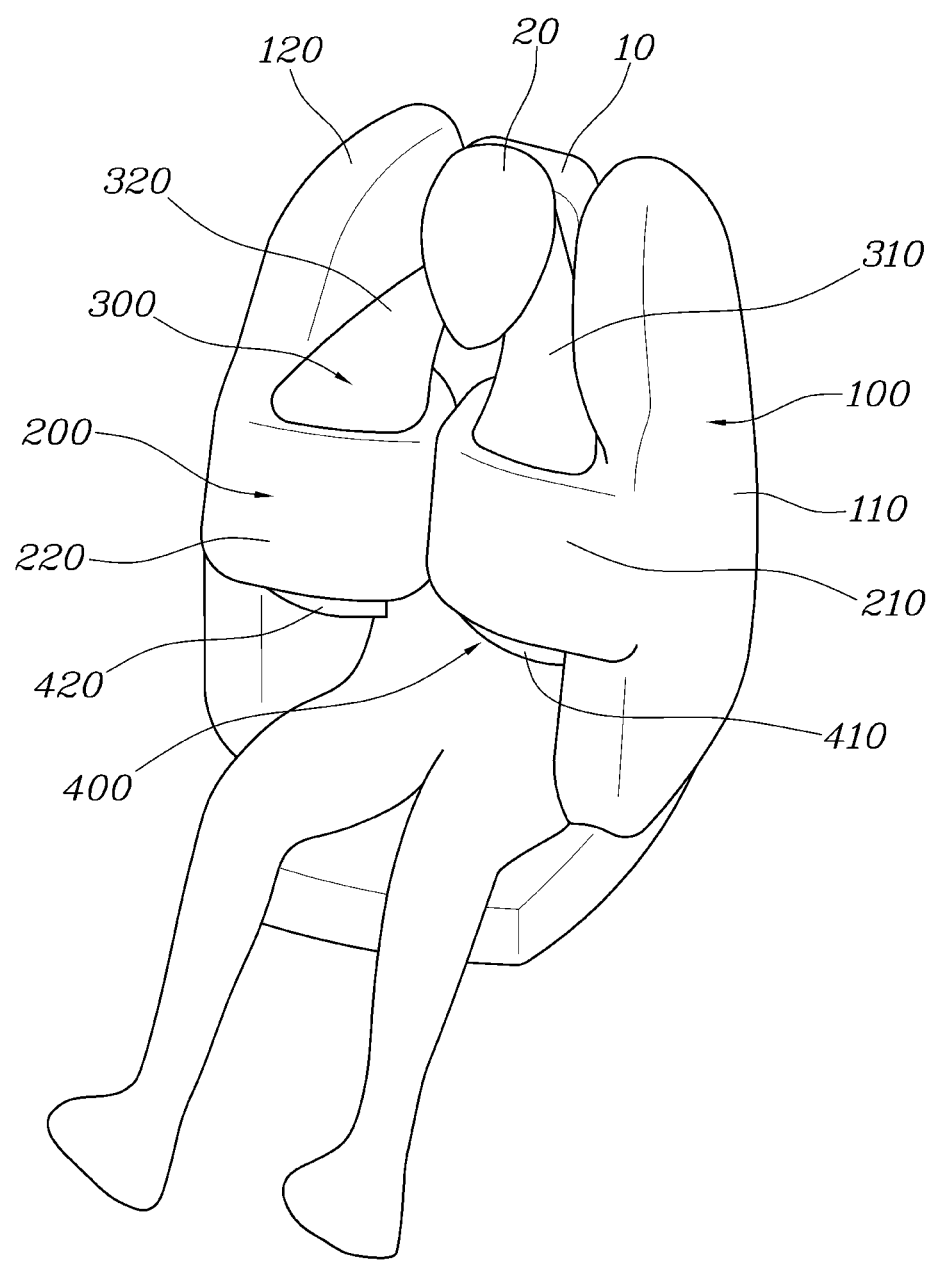
FIG. 1 is a perspective view of a seat airbag for a vehicle in a deployed state according to the present invention.

Specific structural or functional descriptions of the embodiments of the present invention disclosed in this specification or application are exemplified only for the purpose of describing the embodiments according to the present invention, and the embodiments according to the present invention may be implemented in various forms and should not be construed as being limited to the embodiments described in this specification or application.

Since the embodiments according to the present invention can be modified in various ways and have various forms, specific embodiments are illustrated in the drawings and will be described in detail in the present specification or application. However, this is not intended to limit the embodiments according to the concept of the present invention to a specific form of disclosure, and it should be understood to include all changes, equivalents, and substitutes included in the spirit and scope of the present invention.

Terms such as first and second may be used to describe various components, but the components should not be limited by the terms. The above terms are only for the purpose of distinguishing one component from other components, for example, without departing from the scope of the rights according to the concept of the present invention, the first component may be referred to as the second component, and similarly the second component may also be referred to as a first component.

When a component is referred to as being "connected" or "contacted" to another component, it should be understood that it may be directly connected or contacted to the other component, but other components may exist in the middle. On the other hand, when a component is referred to as being "directly connected" or "directly contacted" to another component, it should be understood that there is no other component in the middle. Other expressions describing the relationship between components, such as "between" and "just between" or "adjacent to" and "directly adjacent to" should be interpreted as well.

The terms used in the present specification are only used to describe specific embodiments, and are not intended to limit the present invention. Singular expressions include plural expressions unless the context clearly indicates otherwise. In the present specification, terms such as "comprise" or "have" are intended to designate the existence of a specified feature, number, step, action, component, part, or combination thereof, and are understood that the presence or addition of one or more other features or numbers, steps, actions, elements, parts, or combinations thereof is not preliminarily excluded.

Unless otherwise defined, all terms used herein, including technical or scientific terms, have the same meaning as commonly understood by one of ordinary skill in the art to which the present invention belongs. Terms such as those defined in commonly used dictionaries should be interpreted as having meanings consistent with the meanings of the related technology, and should not be interpreted as ideal or excessively formal meanings unless explicitly defined in the present specification.

A control unit (controller) according to an exemplary embodiment of the present invention may be implemented through an algorithm configured to control the operation of various components of a vehicle or a nonvolatile memory (not shown) configured to store data related to a software command for reproducing the algorithm, and a processor (not shown) configured to perform an operation described below using data stored in the corresponding memory. Here, the memory and the processor may be implemented as separate chips. Alternatively, the memory and processor may be implemented as a single chip integrated with each other. The processor may take the form of one or more processors.

Hereinafter, a seat airbag for a vehicle according to a preferred embodiment of the present invention will be described with reference to the accompanying drawings.

The seat airbag for a vehicle 100 according to the present invention, as shown in FIGS. 1 to 10, includes a side cushion 100 that is deployed to protrude forward from a seatback 10 constituting a vehicle seat and covers and protects the side of a passenger 20 after deployment; a front cushion 200 that is deployed to protrude from the side cushion 100 to the front of the passenger 20 and covers and protects the front of the passenger 20 after deployment; an upper tether 300 that is coupled to connect an upper portion of the seatback 10 and the side cushion 100 and the front cushion 200, and is unfolded in a plane of a predetermined size to restrain the development of the side cushion 100 and the front cushion 200 when the side cushion 100 and the front cushion 200 are deployed; and a lower tether 400 that is coupled to connect a lower portion of the seatback 10 and the front cushion 200, and is unfolded in a plane of a predetermined size to prevent the front cushion 200 from being lifted, and to restrain the development of the front cushion 200 when the front cushion 200 is deployed.

The airbag according to the present invention is a configuration in which the side cushion 100 is deployed to be protruded from the seatback 10, the side cushion 100 is first deployed, and then the front cushion 200 is sequentially deployed from the side cushion 100 and unfolded. Thus, the seat can be moved and rotated, and in particular, it has the advantage of being suitable for use in autonomous vehicles with various seating conditions for passengers.

In addition, in one embodiment according to the present invention, the tether for restraining the deployment of the side cushion 100 and the front cushion 200 is a cotton tether having a predetermined area rather than a general string-shaped tether. In particular, the embodiment is a configuration that restrains the deployment of the side cushion 100 and the front cushion 200 using the strong restraint force of the upper tether 300 and the lower tether 400. Thus, it can effectively restrain both the lateral and frontal and diagonal behaviors of the passenger, thereby further strengthening the protection effect of passengers. As a result, there is an advantage of maximizing the reduction of the injuries of passengers in the event of an accident.

The side cushion 100 according to the present invention covers and protects all of a head 21, a shoulder 22, a chest 23, an abdomen 24, and a pelvis 25 on the side of the passenger 20 when deployed. The front cushion 200 simultaneously covers and protects the area from the shoulder 21 to the abdomen 24 on the front of the passenger 20 when deployed.

The side cushion 100 and the front cushion 200 can both cover and protect the portion of the shoulder 22 with relatively high rigidity among the body parts of the passenger 20, thereby reducing the passenger's injury as much as possible.

The inflator that injects airbag gas is fixedly coupled to the seatback frame constituting the seatback 10, and the airbag gas generated when the inflator is exploded is supplied in the order of the side cushion 100 and the front cushion 200, and thereby, the side cushion 100 is deployed first and then the front cushion 200 is deployed by the pressure of the airbag gas.

Figure 5:
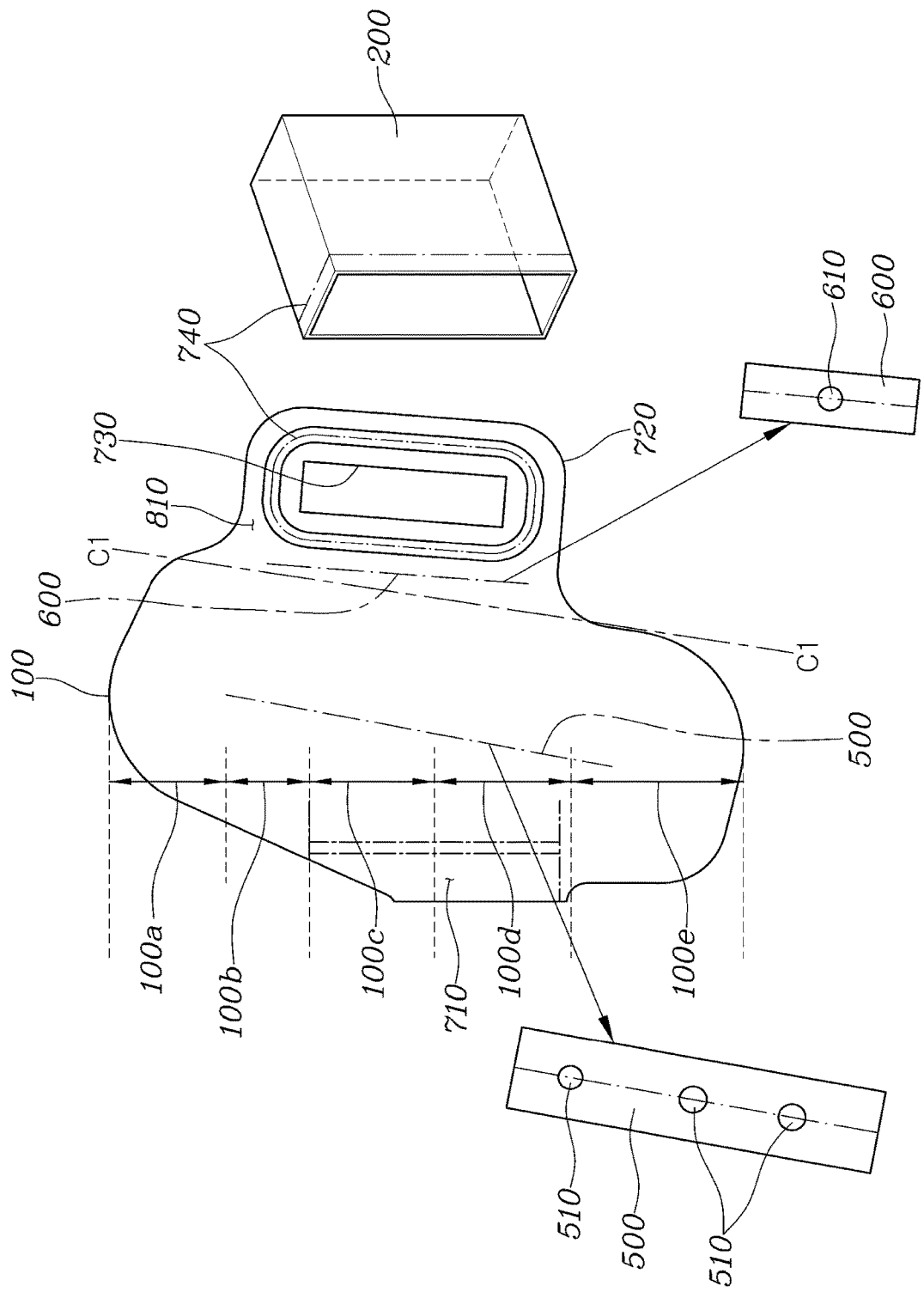
FIG. 5 is a view of a side cushion and a front cushion in a separated state according to the present invention.

In FIG. 5, a reference numeral 710 is an inlet 710 through which airbag gas is supplied from the side cushion 100, and a first separator 500 that divides the inner space of the side fusion 100 while determining the thickness of the deployed cushion is installed in combination with the side cushion 100 inside the side cushion 100. A plurality of first vent holes 510 for controlling the flow of airbag gas is formed in the first separator 500.

In addition, at a front portion 720 of the side cushion 100 connected to the front cushion 200 in the side cushion 100, a connection passage 730 formed with a relatively large hole for connection with the front cushion 200 is formed. At the rear portion of the connection passage 730, a second separator 600 that determines the thickness of the deployed cushion is installed in combination with the side cushion 100. A second vent hole 610 for controlling the flow of the supplied airbag gas is formed in the second separator 600.

When the inflator explodes, the side cushion 100 must be deployed first and then the front cushion 200 must be deployed. Thus, a large amount of airbag gas must first be supplied to the side cushion 100, and for this purpose, the first vent hole 510 is formed in a plurality that is greater than the number of the second vent hole 610, in particular, the total cross-sectional area of the first vent hole 510 is formed larger than the total cross-sectional area of the second vent hole 610.

The side cushion 100 is first deployed and then the front cushion 200 is deployed through tuning of the numbers and the cross-sectional areas of holes of the first and second vent holes 510 and 610.

If, before the side cushion 100 is deployed, the front cushion 200 is first inflated and deployed, the front cushion 200 is caught between the passenger 20 and the vehicle door 30, or between the passenger 20 and the center console 40 so that the probability of deployment failure due to interference is increased. To prevent this, by turning the total cross-sectional area of holes and the numbers of the first and second vent holes 510 and 610, the side cushion 100 is deployed first and then the front cushion 200 can be deployed.

In FIG. 5, a reference numeral 740 denotes a sewing line 740 for coupling the side cushion 100 and the front cushion 200 around the connection passage 730.

Figure 6:
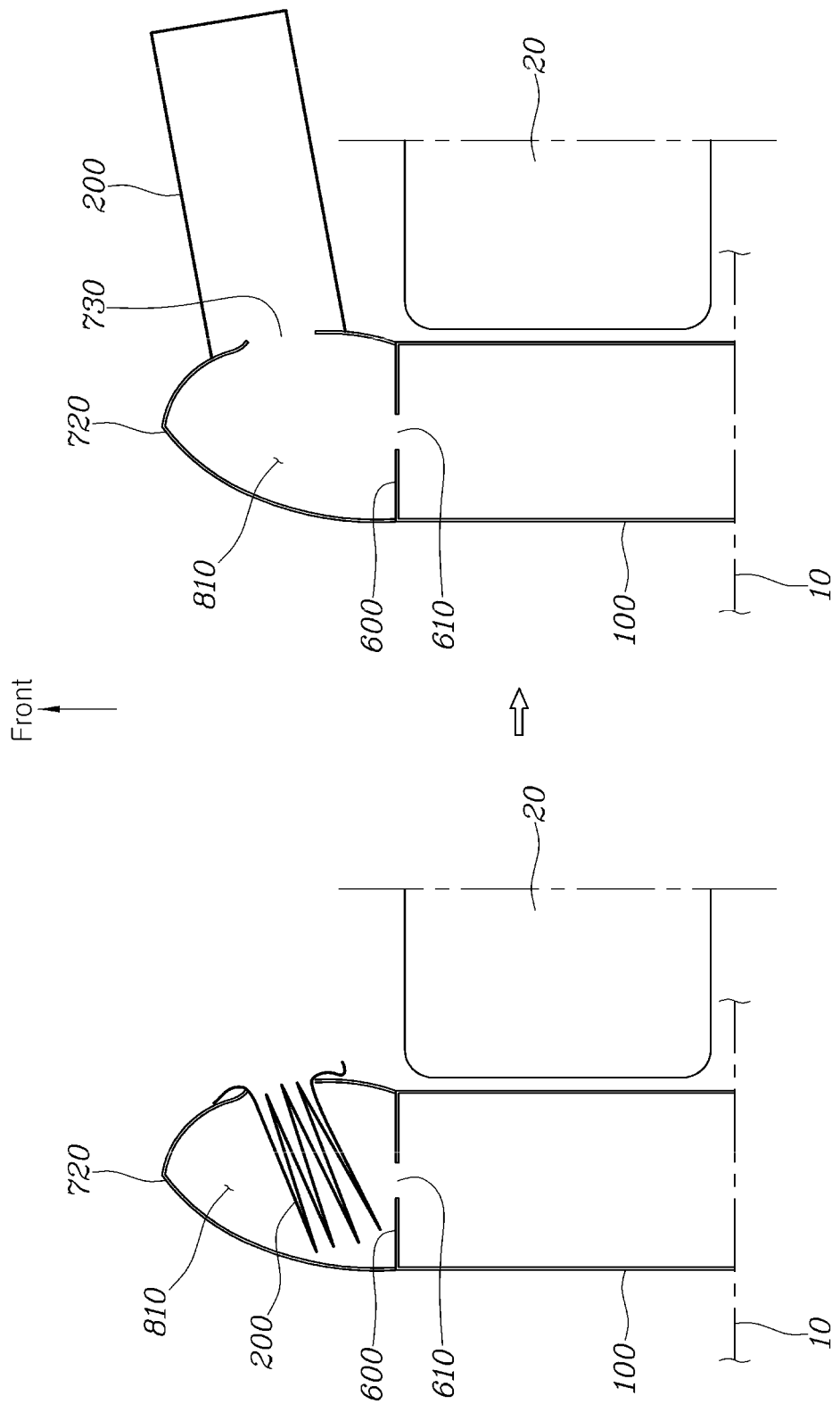
FIG. 6 is a view showing a state in which a front cushion is accommodated in a cushion storage space of a side cushion and the front cushion is deployed according to the present invention.

The folding storage structure of the front cushion 200 and the deployment structure of the side cushion 100 and the front cushion 200 will be described in more detail with reference to FIGS. 5 to 7.

The front cushion 200 is sewing connected to the front portion 720 of the side cushion 100 based on the deployed state of the side cushion 100, and at the front portion 720 of the side cushion 100 a cushion storage space 810 is provided inside the side cushion 100. The front cushion 200 is inserted into the cushion storage space 810 in a folded state (left figure in FIG. 6), and then protrudes out of the cushion storage space 810 by airbag gas and is deployed to the front of the passenger 20 (right figure in FIG. 6).

When an accident occurs, the inflator explodes, and the side cushion 100 is first deployed from the seatback 10 by the pressure of the airbag gas generated during the explosion of the inflator, and after the deployment of the side cushion 100 begins, the deployment of the front cushion 200 begins with a time difference.

That is, when the airbag gas generated by the explosion of the inflator flows into the side cushion 100 through the inlet 710, the deployment of the side cushion 100 starts from the seatback 10. When the front portion 720 of the side cushion 100 that has started to be deployed is located in front of the passenger 20 (left figure in FIG. 6), from this time, the airbag gas is introduced into the cushion storage space 810 through the second vent hole 610 of the second separator 600, and the front cushion 200 accommodated in a folded state in the cushion storage space 810 starts to be deployed while protruding out of the cushion storage space 810 by the pressure of the airbag gas introduced into the cushion storage space 810. As the airbag gas in the cushion storage space 810 flows into the front cushion 200 through the connection passage 730, the front cushion 200 protrudes toward the front of the passenger 20 seated on the seat, and the deployment is completed (the right figure in FIG. 6).

On the other hand, in order to allow the front cushion 200 accommodated in the folded state in the cushion storage space 810 to quickly exit and deployed out of the cushion storage space 810, it is preferable that the front cushion 200 is bellow folded and is accommodated in the cushion storage space 810.

The side cushion 100 and the front cushion 200 are sewn and coupled along the circumference of the connection passage 730 positioned at the front portion 720 of the side cushion 100, so that the side cushion 100 and the front cushion 200 are connected to each other. The space up to the connection passage 730 based on the second separator 600 becomes the cushion storage space 810, and the cushion storage space 810 is connected to the front cushion 200 through the connection passage 730.

The deployed side cushion 100 can cover and protect all of the head 21, the shoulder 22, the chest 23, the abdomen 24, and the pelvis 25 on the side of the passenger 20 as described above. To this end, from the top to the bottom based on deployed state, the side cushion 100 can be vertically divided into a head protection area 100a, a shoulder protection area 100b, a chest protection area 100c, an abdominal protection area 100d, and a pelvic protection area 100e.

Therefore, when a reference line C1 is determined as the line connecting the head protection area 100a and the pelvic protection area 100e up and down in the front of the side cushion 100, the area protruding toward the front of the reference line C1 becomes the front portion 720 of the side cushion 100 on which the connection passage 730 is positioned, and one side of the front cushion 200 is coupled to the front portion 720 of the side cushion 100 through sewing coupling.

The second separator 600 may be installed to match the reference line C1 or may be installed to be positioned in front of the reference line C1 within a range that sufficiently secures the cushion storage space 810.

In FIG. 5, a configuration in which the second separator 600 is installed so as to be positioned in front of the reference line C1 is shown as an example.

The reason why the second separator 600 is installed to match the reference line C1 or is installed to be located in front of the reference line C1 within a range that can sufficiently secure the cushion storage space 810 is for continuously maintaining the folded state when the front cushion 200 is bellow folded and accommodated in the cushion storage space 810, and is for preventing a phenomenon in which the front cushion 200 that is bellow folded and accommodated in the cushion storage space 810 flows down to the rear side (in the direction of the seatback) of the side cushion 100.

If the second separator 600 is installed to be located behind (in the direction of the seatback) the reference line (C1), the size of the cushion storage space 810 becomes excessively larger than the size of the bellow folded front cushion 200. In this case, the front cushion 200 accommodated in the cushion storage space 810 flows down to the rear side (the direction in which the seatback is located) of the side cushion 100, and the folding state is released. When the folding state is released, the deployment operation of the front cushion 200 is not smooth, so that a deployment failure of the front cushion 200 may occur.

Therefore, for smooth and rapid deployment of the front cushion 200, it is preferable to install the second separator 600 to match the reference line C1 or to locate in front of the reference line C1 within a range that can sufficiently secure the cushion storage space 810.

The cushion storage space 810 positioned at the front portion 720 of the side cushion 100, as shown in FIG. 5, may be formed by the second separator 600 that is installed in parallel with a vertical sewing line 740a coupling the side cushion 100 and the front cushion 200.

Figure 7:
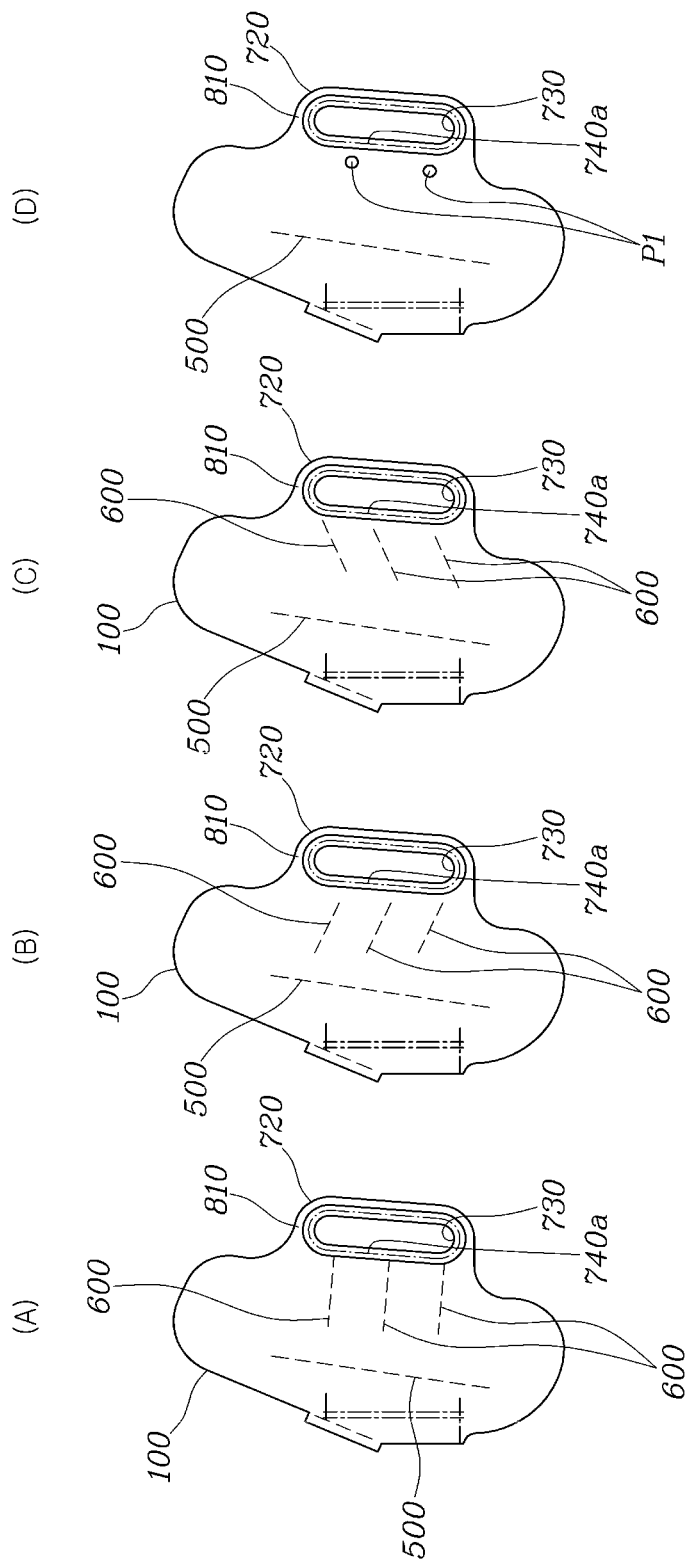
FIG. 7 is a view showing a structure in which a cushion storage space is formed according to the present invention, for each embodiment.

As another example, the cushion storage space 810 may be formed by a plurality of second separators 600 that is installed in a horizontal direction with respect to the vertical sewing line 740a as shown in (A) of FIG. 7 or formed by a plurality of second separators 600 that is installed in a diagonal direction with respect to the vertical sewing line 740a as shown in (B) and (C) of FIG. 7, or formed by a plurality of coupling points P1 that is coupled to connect both sides of the side cushion 100 in the rear position of the connection passage 730 (direction in which the seatback is located) as shown in (D) of FIG. 7.

The coupling point P1 may be a sewing coupling or coupling using an adhesive by bringing the inner portion (one surface facing the passenger) and the outer portion (the opposite side of the inner portion) of the side chamber 100 into contact.

Figure 8:
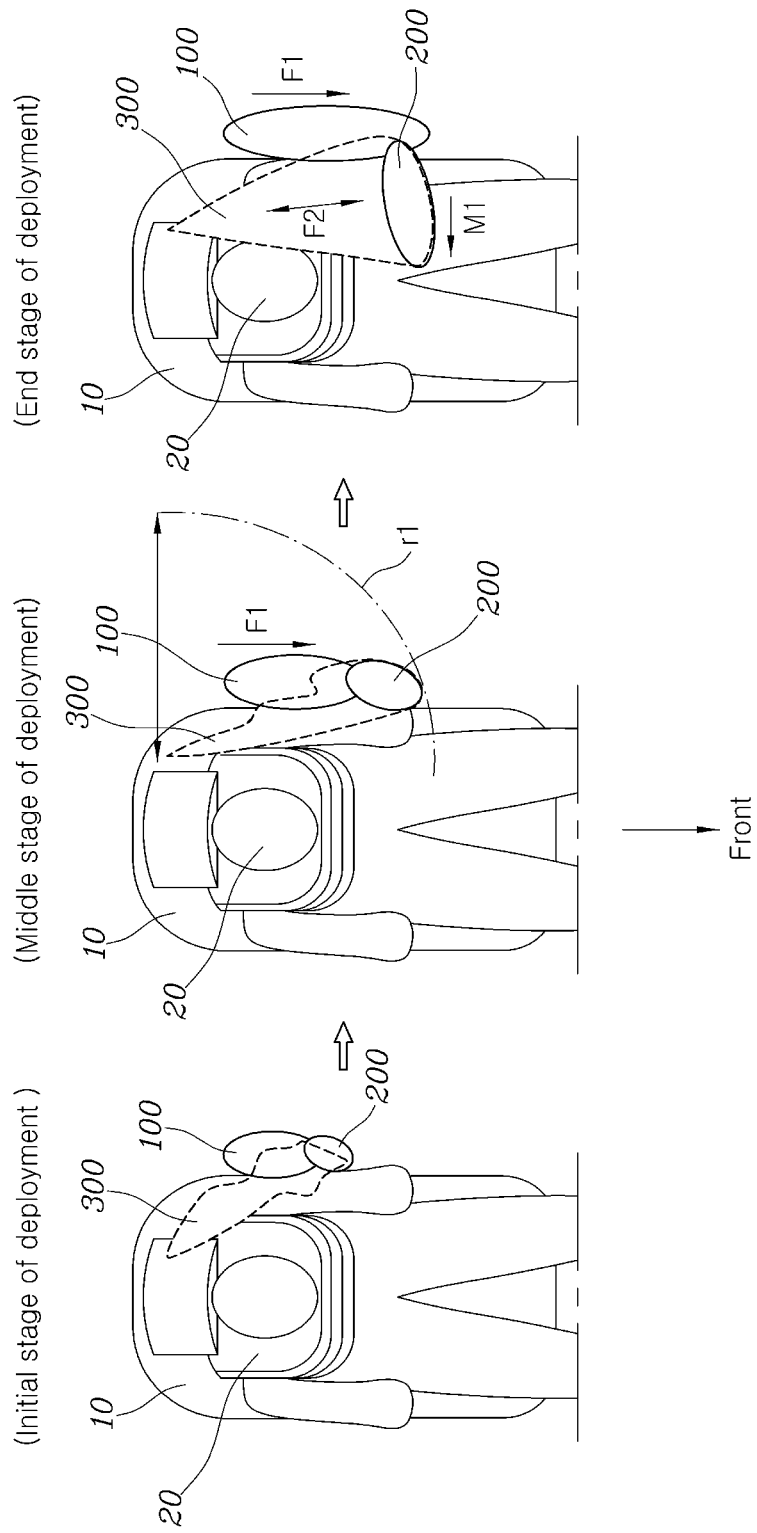
FIG. 8 is a view for explaining a state in which a side cushion and a front cushion are deployed according to the present invention.
Figure 9:
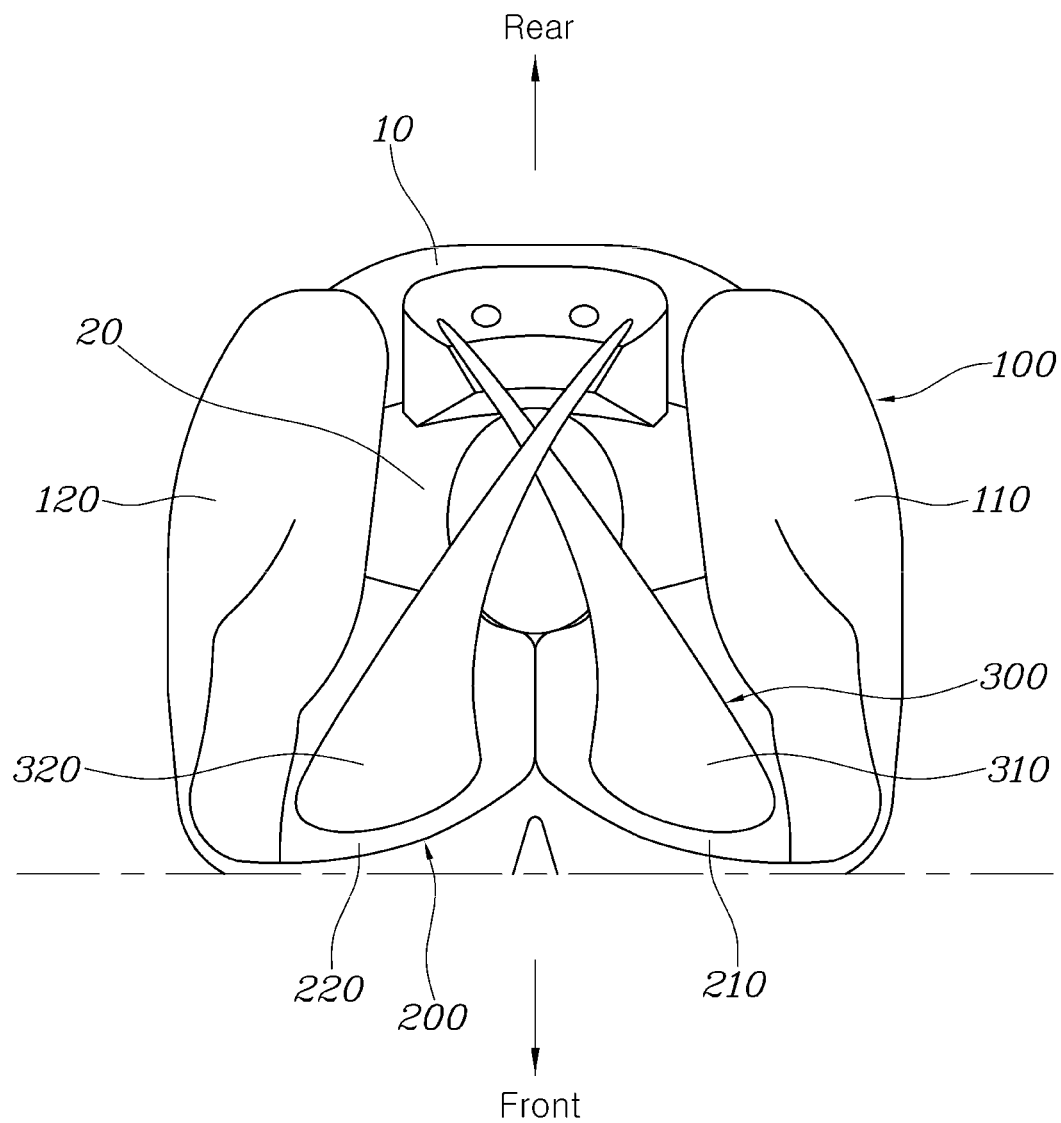
FIGS. 9 to 10 are views for explaining the deployment shapes of a first upper tether and a second upper tether according to the present invention, for each embodiment.
Figure 10:
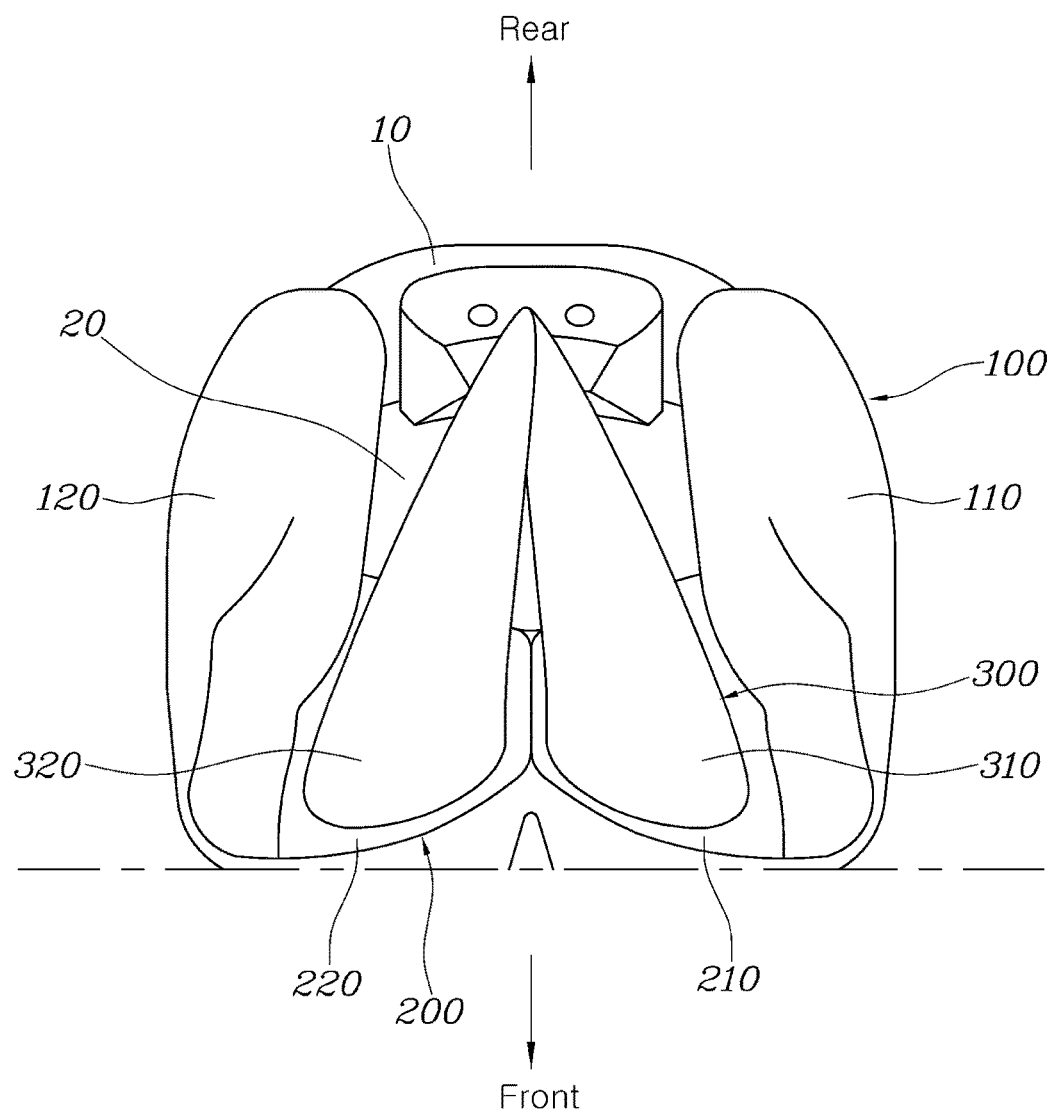

FIG. 8 shows the deployment process of the side cushion 100 and the front cushion 200. At the initial stage of deployment, the side cushion 100 and the front cushion 200 begin to be deployed by the pressure of the airbag gas, and the upper tether 300 also begins to unfold.

At the middle stage of deployment, the front cushion 200 is restrained within a rotation radius r1 of the upper tether 300 by the restraint of the upper tether 300, and the front cushion 200 is pushed forward by the forward deployment force (arrow F1) of the side cushion 100.

An arrow L1 is the maximum length of the upper tether 300.

At the portion stage of deployment, the deployment of the side cushion 100 is completed, and the front cushion 200 is bent toward the passenger 20 by the tension F2 of the upper tether 300 to reach the front of the passenger 20. (Arrow M1), Thus, the side cushion 100 covers and protects the side of the passenger 20, and the front cushion 200 covers and protects the front of the passenger 20.

The side cushion 100 according to the present invention includes a first side cushion 110 that is deployed in the space between a vehicle door 30 and the side of the passenger 20 at one side of the seatback 10, and a second side cushion 120 that is deployed into a space between the center console 40 and the side of the passenger 20 at the other side of the seatback 10. The front cushion 200 includes a first front cushion 210 that is extendedly deployed from the first side cushion 110 toward the front of the passenger 20, and a second front cushion 220 that is extendedly deployed from the second side cushion 120 toward the front of the passenger 20. When the first front cushion 210 and the second front cushion 220 are deployed, their ends are in contact with each other and are connected to the left and right. Thus, it is possible to further enhance the protective effect of the passenger 20 with a more solid support.

The upper tether 300 is configured to avoid an area that causes harm to the neck of the passenger 20 while passing over the shoulder 22 of the passenger 20, that is, to deploy to an area that does not harm the neck of the passenger 20.

The upper tether 300 according to the present invention is formed so that the unfolded shape becomes a triangular shape when deployed. Any one vertex is fixedly coupled to the upper portion of the seatback 10, one of the outer sides is attached to the inner surface of the side cushion 100, and one side facing the front is sewn to the upper surface of the front cushion 200.

The upper tether 300 includes a first upper tether 310 that is coupled to connect the upper portion of the seatback 10, and the inner surface of the first side cushion 110 and the upper surface of the first front cushion 210, and a second upper tether 320 that is coupled to connect the upper portion of the seatback 10, and the inner surface of the second side cushion 120 and the upper surface of the second front cushion 220.

On the other hand, as the coupling point at which the first upper tether 310 and the upper portion of the seatback 10 are coupled is spaced apart from the first side cushion 110 in the opposite direction, the tension of the first upper tether 310 increases. As the tension of the first upper tether 310 increases, the restraint force of the first side cushion 110 and the first front cushion 210 by the first upper tether 310 increases. Thus, it is possible to restrain the passenger 20 more reliably, and injuries to passengers in the event of an accident can be reduced as much as possible.

Likewise, as the coupling point at which the second upper tether 320 and the upper portion of the seatback 10 are coupled is spaced apart from the second side cushion 120 in the opposite direction, the tension of the second upper tether 320 increases, As the tension of the second upper tether 320 increases, the restraint force of the second side cushion 120 and the second front cushion 220 by the second upper tether 320 increases. Thus, it is possible to restrain the passenger 20 more reliably, and injuries to passengers in the event of an accident can be reduced as much as possible.

Figure 2:
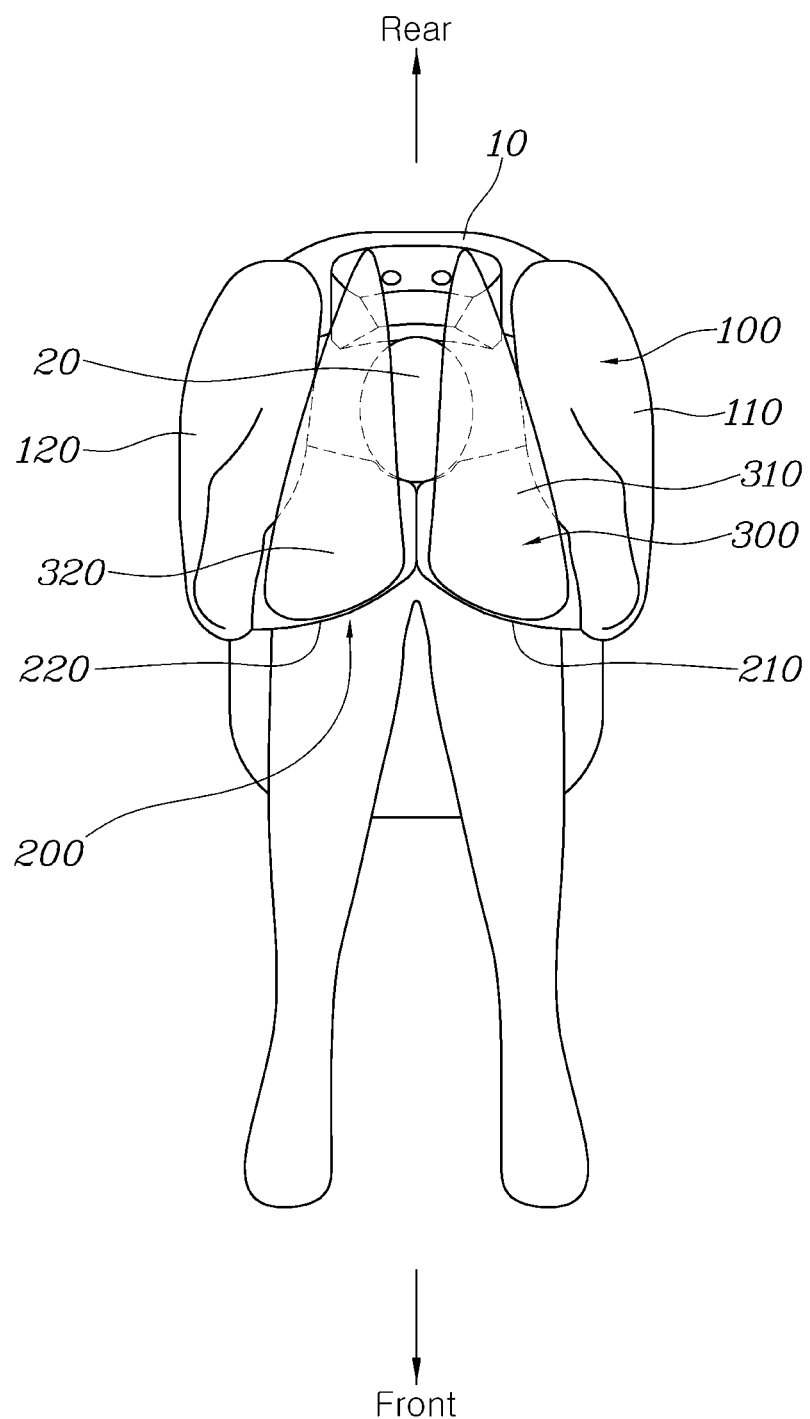
FIGS. 2 to 4 are a plan view, a front view, and a side view of FIG. 1.
Figure 3:
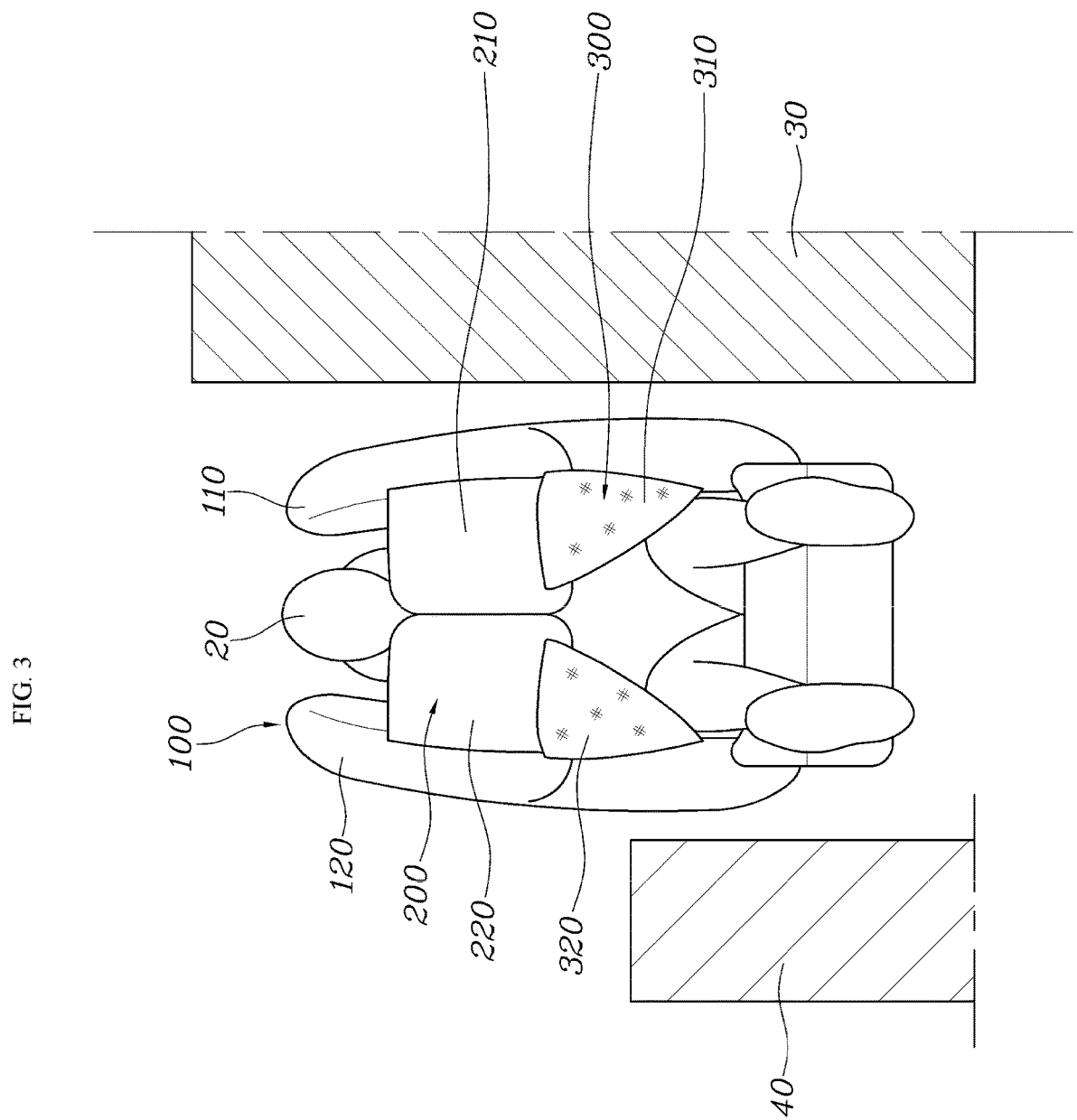
Figure 4:
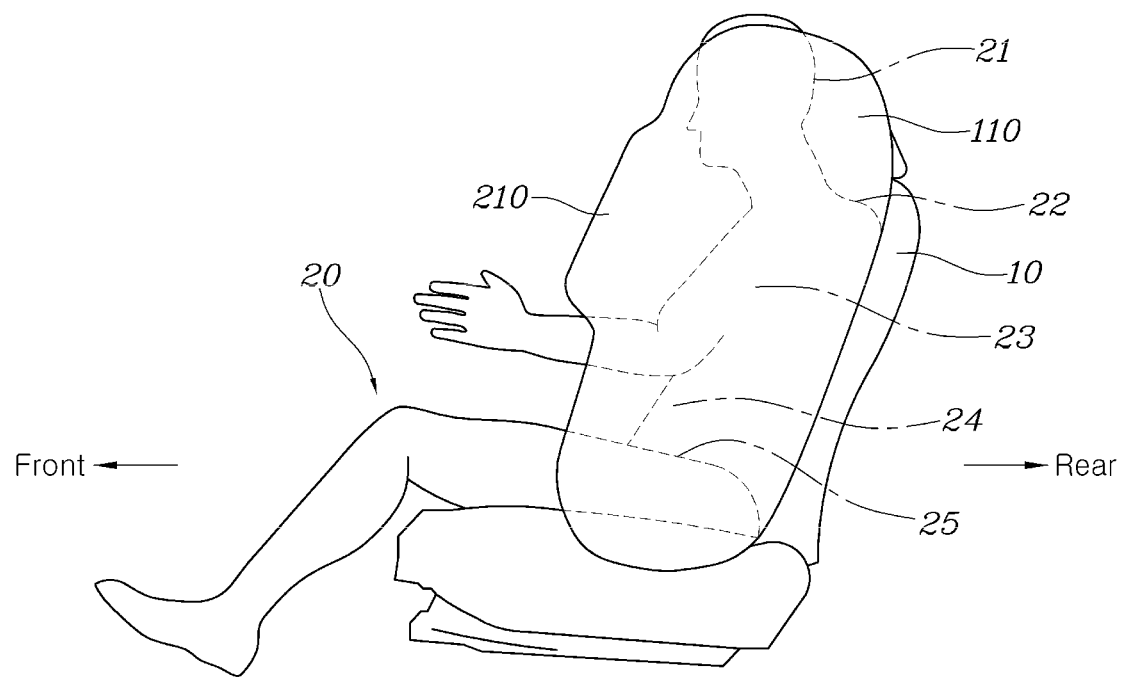

When the first upper tether 310 and the second upper tether 320 are deployed, they can be deployed in a shape of II as shown in FIG. 2 or an X-shape as in FIG. 7 or a V-shape as shown in FIG. 8.

When the first upper tether 310 and the second upper tether 320 are deployed in a V shape, the tension of the first upper tether 310 and the second upper tether 320 is increased compared to when deployed in a II shape, thereby more effective in restraint of passengers. In addition, when the first upper tether 310 and the second upper tether 320 are deployed in an X shape, the tension of the first upper tether 310 and the second upper tether 320 is increased compared to when deployed in a II shape or V shape, so that the passenger can be restrained most effectively.

According to the present invention, the lower tether 400 is formed to have a triangular unfolded shape when deployed. Any one vertex is fixedly coupled to the lower portion of the seatback 10 (a stud that fixes the inflator at the lower portion of the seatback frame or the lower portion of the seatback frame), and one side facing the front is sewn and coupled to the bottom surface of the front cushion 200.

The lower tether 400 is coupled with the bottom surface of the front cushion 200 to prevent the front cushion 200 from being lifted upward when the front cushion 400 is deployed, through which the restraint power of the front cushion 200 can be further strengthened.

The lower tether 400 is formed as a surface than the conventional tether formed in the form of a string, so that the lower tether 400 can exert a stronger restraint force, so that there is advantage of more securely protecting the passenger 20.

In accordance with the present invention, the lower tether 400 is configured to include a first lower tether 410 that is coupled to connect the lower portion of the seatback 10 and the bottom surface of the first front cushion 210, and a second lower tether 420 that is coupled to connect the lower portion of the seatback 10 and the bottom surface of the second front cushion 220.

As described above, the seat airbag for a vehicle according to the embodiment of the present invention is a configuration in which the side cushion 100 is deployed to protrude forward from the seatback 10 to protect the side of the passenger 20, and the front cushion 200 protrudes from the side cushion 100 in front of the passenger 20 to protect the front of the passenger 20. Thus, it can be applied to various autonomous vehicles in which the movement and rotation of the seat and the seating condition of the passenger are various. Particularly, there is an advantage of being able to more effectively protect the passengers 20 of the autonomous vehicle.

In addition, the embodiment according to the present invention is configured with the upper tether 300 and the lower tether 400 that have a predetermined area in order to exert a strong restraint force restraining the deployments of the side cushion 100 and the front cushion 200. Thus, it is possible to effectively restrain the passenger's lateral behavior, forward behavior, and diagonal behavior, thereby further enhancing the passenger's protective effect, and through this, there is the advantage of maximizing the reduction of the passenger's injuries in case of an accident.

In addition, the embodiment according to the present invention is a configuration in which both the side cushion 100 and the front cushion 200 can cover and protect the portion of the shoulder 22 having relatively high rigidity among the body parts of the passenger 20. Thus, there is an advantage that can reduce the injuries to passengers as much as possible.

In addition, the embodiment according to the present invention is a configuration in which the first separator 500 having the first vent hole 510 is installed inside the side cushion 100, the second separator 600 having the second vent hole 610 is installed in the connection portion of the side cushion 100 and the front cushion 200, and the total cross-sectional area of the first vent hole 510 is larger than the total cross-sectional area of the second vent hole 610. There is an advantage of preventing an airbag deployment failure situation in which the front cushion 200 is first inflated before the side cushion 100 is deployed through tuning of the first vent hole 510 and the second vent hole 610.

In addition, the embodiment according to the present invention is a configuration in which the cushion storage space 810 capable of accommodating the front cushion 200 is provided at the front portion 720 connected to the front cushion 200 in the side cushion 100, and the bellow folded front cushion 200 is inserted and accommodated into the cushion storage space 810. Through the storage structure of the front cushion 200, a certain portion of the deployment of the side cushion 100 progresses, and then, the deployment of the front cushion 200 starts at a time difference. Thus, there is an advantage of securing the reliability of the cushion deployment by eliminating the deployment failure of the front cushion 200.

Although the present invention has been illustrated and described in connection with specific embodiments, it will be obvious to those of skilled in the art that the present invention can be variously improved and changed within the scope of the technical spirit of the present invention provided by the following claims.

What is claimed is:

1. An airbag comprising:
a side cushion configured to, when deployed, protrude forward from a seatback of a seat and cover a side of an object occupying the seat, the side cushion having an inner space and a cushion storage space at a front portion of the inner space; and
a front cushion stored folded in the cushion storage space and configured to, when deployed, protrude from the cushion storage space of the side cushion toward a front of the object occupying the seat,
wherein the front cushion is connected to a front portion of the side cushion when the airbag is deployed.

2. The airbag of claim 1, wherein the front cushion stored in the cushion storage space is bellow folded.

3. The airbag of claim 1, wherein the side cushion comprises a first separator dividing the inner space of the side cushion, the first separator having a plurality of first vent holes configured to control a flow of an airbag gas.

4. The airbag of claim 1, further comprising:
a connection passage positioned at the front portion of the side cushion and extending to the front cushion; and
a second separator positioned at a rear portion of the connection passage and having a second vent hole configured to control a flow of an airbag gas supplied to the front cushion.

5. The airbag of claim 1, wherein the side cushion comprises:
a first separator positioned in the inner space of the side cushion and having a first vent hole; and
a second separator positioned in the inner space of the side cushion, having a second vent hole, and positioned in front of the first separator when the airbag is deployed,
wherein a cross-sectional area of the first vent hole is larger than that of the second vent hole.

6. The airbag of claim 4, wherein:
the side and front cushions are sewn together along a circumference of the connection passage,
the cushion storage space extends from the second separator to the connection passage, and
the cushion storage space is connected to the front cushion through the connection passage.

7. The airbag of claim 4, wherein:
the side cushion, when deployed, is vertically divided into a head protection area, a shoulder protection area, a chest protection area, an abdominal protection area and a pelvic protection area, and
the front portion of the side cushion comprises a portion of the side cushion protruding forward from a reference line vertically connecting the head protection area and the pelvic protection area in front of the side cushion.

8. The airbag of claim 7, wherein the second separator is arranged along or in front of the reference line to ensure a sufficient space for the cushion storage space.

9. The airbag of claim 4, wherein the cushion storage space is formed by at least one of:
the second separator arranged in parallel to a vertical sewing line that combines the side front cushions;
a plurality of the second separators arranged in a horizontal direction with respect to the vertical sewing line;
a plurality of the second separators arranged in a diagonal direction with respect to the vertical sewing line; and
a plurality of coupling points connecting both sides of the side cushion in the rear portion of the connection passage.

10. An airbag comprising:
a side cushion configured to, when deployed, protrude forward from a seatback of a seat and cover a side of an object occupying the seat, the side cushion having a front portion and a storage space positioned at the front portion of the side cushion; and
a front cushion stored at the storage space of the side cushion and configured to, when deployed, protrude from the front portion of the side cushion toward a front of the object occupying the seat,
wherein the side and front cushions are configured such that, when activated, the side cushion starts deploying before the front cushion starts deploying.

11. The airbag of claim 10, wherein the front cushion is configured to start deploying when the front portion of the deployed side cushion is positioned in front of the object occupying the seat.

* * * * *